United States Patent [19]
Coen et al.

[11] Patent Number: 6,164,435
[45] Date of Patent: Dec. 26, 2000

[54] MODULAR STRUCTURE FOR A PLATE FOR RECEIVING PRODUCTS AS THEY COME OFF A CARRY SECTION OF AN ENDLESS CHAIN-TYPE CONVEYOR

[75] Inventors: Daniele Coen, Villasanto; Lorenzo Pinotti, Correggio, both of Italy

[73] Assignee: Rexnord Marbett S.p.A., Italy

[21] Appl. No.: 09/187,636

[22] Filed: Nov. 6, 1998

[30] Foreign Application Priority Data

Nov. 12, 1997 [EP] European Pat. Off. .............. 98730592

[51] Int. Cl.⁷ .................................................. B65G 47/66
[52] U.S. Cl. ........................................................ 198/600
[58] Field of Search ................................ 198/600, 635

[56] References Cited

U.S. PATENT DOCUMENTS

| | | | |
|---|---|---|---|
| 2,624,444 | 1/1953 | Lasabona | 198/600 X |
| 3,206,001 | 9/1965 | Peppler | 198/600 X |
| 5,215,182 | 6/1993 | Garbagnati | 198/635 |
| 5,584,373 | 12/1996 | Layne | 198/600 X |

*Primary Examiner*—James R. Bidwell
*Attorney, Agent, or Firm*—Michael Best & Friedrich LLP

[57] ABSTRACT

A structure for a plate for receiving products as they come off a carry section of an endless chain-type conveyor, capable of being positioned coplanar with the carry section essentially in the continuation thereof, which structure is of unusually simple construction, comprising tiles arranged together side by side at least on respective sides that lie transversely to the carry section.

9 Claims, 2 Drawing Sheets

MODULAR STRUCTURE FOR A PLATE FOR RECEIVING PRODUCTS AS THEY COME OFF A CARRY SECTION OF AN ENDLESS CHAIN-TYPE CONVEYOR

FIELD OF THE INVENTION

The present invention relates to a structure for a plate for receiving products as they come off a carry section of an endless chain-type conveyor, capable of being positioned coplanar with the said carry section essentially in the continuation thereof.

BACKGROUND OF THE INVENTION

As is known, products conveyed by an endless chain-type conveyor, whether the latter is made of a belt, slats, chain links or the like, need to be received on a plate leading to a product processing station downstream of the conveyor or to another conveyor substantially in line with the previous conveyor. It will be clear that in the latter case, this receiving plate acts as a connecting plate between two endless chain-type conveyors arranged end to end.

Currently known receiving plates have to be custom-made to suit the distance they have to cover, and are fixed to the frame of the endless chain conveyor or conveyors so as to ensure that the products are received or transferred from one conveyor to the next.

Although they generally fulfil the above requirements, known plates leave much to be desired as regards their fabrication, for known receiving plates have to be tailor-made for the specific application for which they are intended.

The problem tackled by the present invention is that of devising a structure for a receiving plate having structural and functional features such as to overcome the abovementioned disadvantage.

SUMMARY OF THE INVENTION

This problem is solved with a receiving plate of the type specified that is characterized by the fact that it comprises tiles arranged together side by side at least on respective sides that lie transversely to the said carry section.

BRIEF DESCRIPTION OF THE DRAWINGS

Other features and advantages of the receiving plate structure according to the present invention will be clear from the following description of a preferred embodiment thereof. This is given by way of non-limiting indication with reference to the accompanying figures.

DETAILED DESCRIPTION OF THE INVENTION

Figure 1:
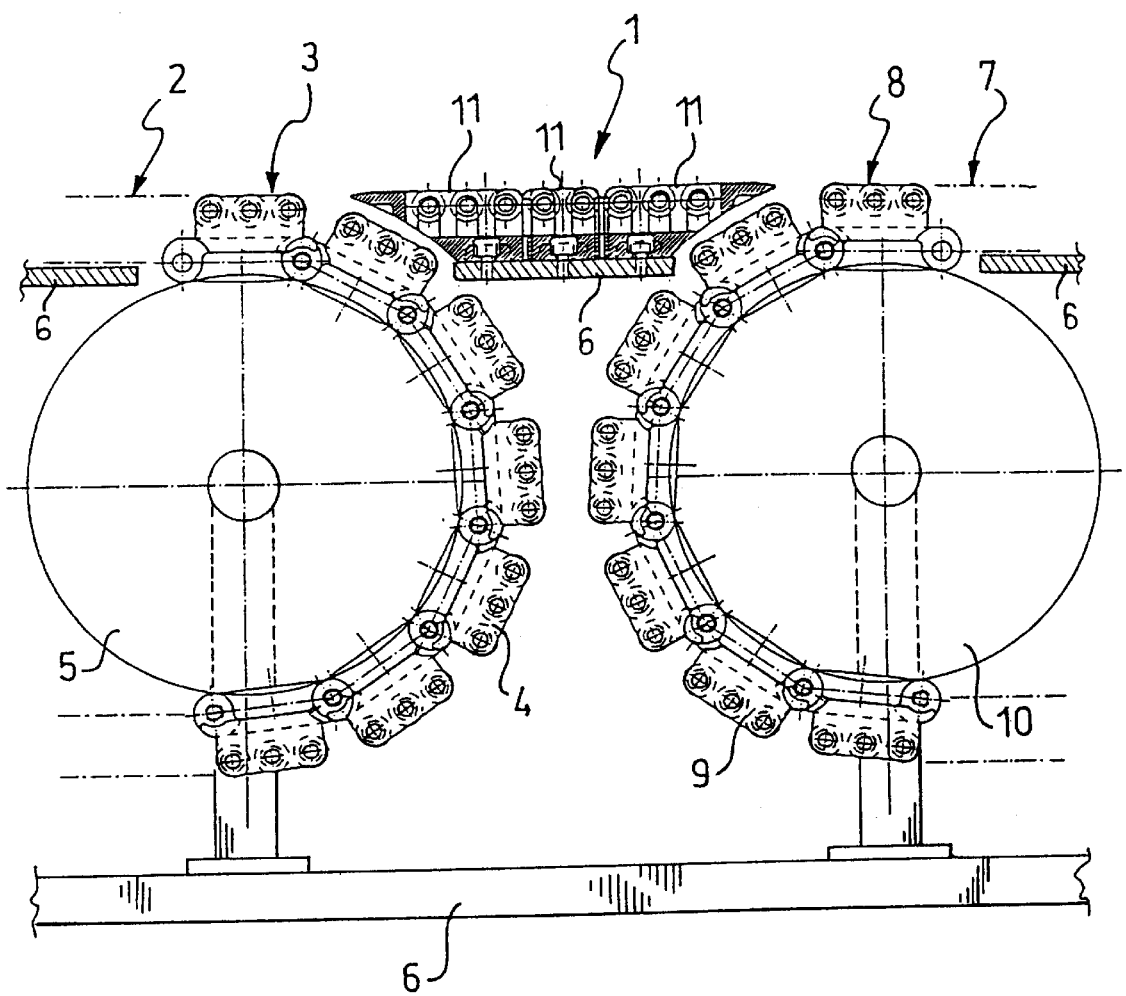
FIG. 1 shows an elevation of a receiving plate in accordance with the present invention.
Figure 2:
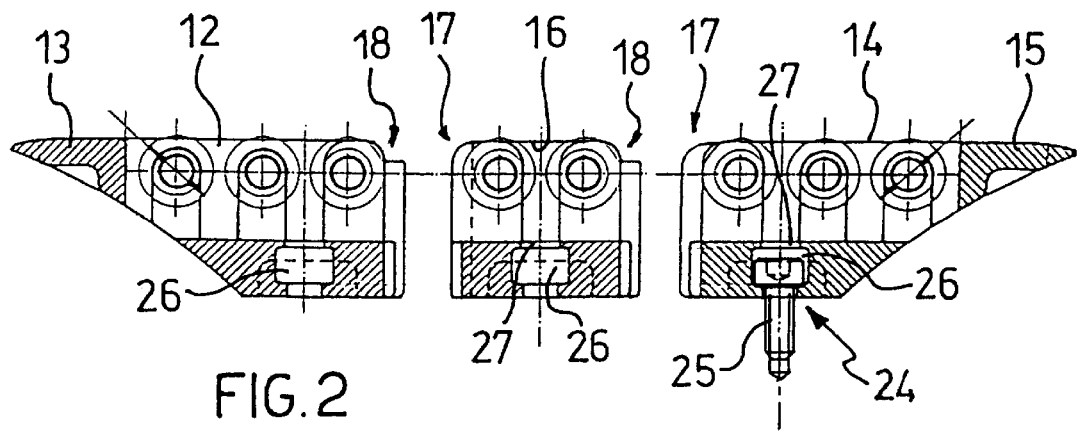
FIG. 2 shows an elevation in partial section and with parts detached of the receiving plate of FIG. 1.
Figure 3:
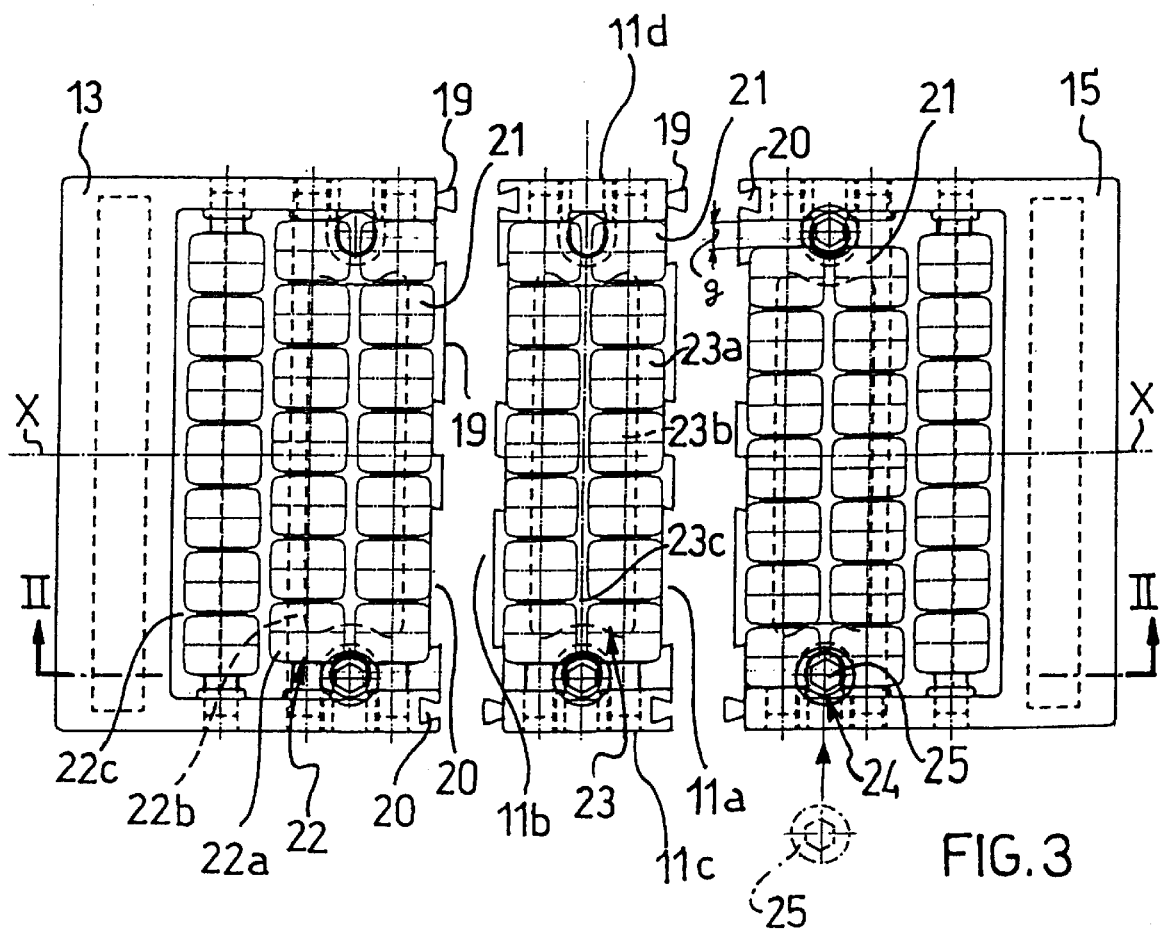
FIG. 3 shows a plan view with parts detached of the receiving plate of FIG. 1.

With reference to the accompanying figures, the number 1 is a general reference for a receiving plate in accordance with the present invention.

The receiving plate 1 is positioned essentially in the continuation of a carry section 2 of an endless chain-type conveyor, marked 3, which comprises an endless chain 4 which in this particular case is an endless chain of links passing at one end around a wheel 5 mounted on a frame 6.

In the example illustrated the receiving plate 1 extends as far as a carry section 7 of a second endless chain-type conveyor 8 that comprises a closed chain 9 passing at one end around a wheel 10 which in turn is mounted on the frame 6. The line X—X is a longitudinal axis along which the conveyors 3 and 8 and the plate 1 extend.

The plate 1 is coplanar with the carry sections 2 and 7 of the two endless chains 4 and 9.

The receiving plate 1 according to the present invention comprises a plurality of tiles 11: these are arranged together side by side on respective sides 11a and 11b that lie transversely with respect to the longitudinal direction X—X of the carry sections 2 and 7.

It should be observed that the receiving plate 1 is of a structure consisting entirely of the said tiles 11 arranged side by side. In other words the said side-by-side tiles 11 constitute, when put together, the entire structure of the receiving plate.

More particularly, of the plurality of tiles 11, two are end tiles: to be precise, one is a first end tile marked 12 and having a lip 13 to match the curvature of the endless chain 4 as it begins to pass around the wheel 5, one is a second end tile 14 having a lip 15 to match the curvature of the endless chain 9 where it passes around the wheel 10, and lastly there are a plurality of extension tiles that are all marked 16.

In the specific example illustrated in the figures, only one extension tile is present. However, the number of extension tiles will of course be chosen to fit the distance to be covered between the carry sections of the conveyors.

Between each tile 11 and the adjacent tile 11 there are preferably interlocking means and complementary interlocking means 17 and 18, respectively, which fit together so that adjacent tiles interlock.

For this purpose, each extension tile 16 comprises interlocking means 17 and complementary interlocking means 18 on its opposite transverse sides 11a and 11b, and these means fit together.

In particular the interlocking means 17 comprise tenons 19 and mortises 20 having dovetail profiles.

It should be observed that the tenons 19 and the mortises 20 are arranged symmetrically with respect to the longitudinal axis X—X of the receiving plate.

On the matter of the tiles 11, it will readily be seen that the extension tiles 16 will, if numerous, nonetheless all be identical to each other. As regards the end tile 12 and end tile 14, these too are identical to each other and are arranged one above the other.

Each tile 11 is preferably provided on its upper surface with a respective roller set 21. In particular each end tile 12 and 14 comprises a roller set 22 made up of three rows of rollers 22d rotating idly on respective spindles 22b mounted in a seat 22c formed in that tile.

Turning now to the extension tiles 16, each of these comprises a roller set 23 made up of two rows 23a of idly rotating rollers on respective spindles 23b mounted in a seat 23c formed in that tile.

It should be observed that the rollers 22a and 23a of the roller sets 22 and 23 are mounted on respective spindles 22b and 23b on which they are axially moveable, having a specified amount of axial play for reasons which will appear later in this description.

Each tile 11 is advantageously provided with fixing means 24 for fixing it to the frame 6. In this way each tile 11 is individually fixable to this frame 6.

The fixing means 24 of each frame include two hexagon socket-head screws 25 located on the opposite longitudinal sides 11c and 1d of each tile. These screws 25 are housed in seats 26, which are formed on the said longitudinal sides and are open to the said sides. The screws 25 can therefore be inserted into their seats 26 transversely to their axis rather than in the direction of their axis.

It should be observed that each seat 26 is open in the upward direction via an opening 27 to allow access with a wrench to the head of the screw. It should be observed that the opening 27 is situated below the set of rollers and that, to allow a wrench to reach the head of the screws 25 through the opening 27, the rollers 22a or 23a of the roller set 22 or 23 are moved along the respective planes 22b or 23b alternately in either direction so as to take up the above-mentioned axial play with which they are mounted, first towards one screw and then towards the other.

The width of the plate will of course be made identical to the width of the carry sections of the conveyors. This desired width of the plate is advantageously produced by arranging identical tiles together side by side, including along their longitudinal sides, if necessary.

During operation, the products conveyed by the conveyor 3 reach the receiving plate 1 and, partly through being pushed by the products behind, and partly because of the momentum they have acquired on the carry section, they travel onto the receiving plate and reach the carry section of the conveyor 8, which then takes over their conveyance.

Owing to the presence of the roller set on each individual tile, the movement of the products over the transfer plate takes place with limited friction, in particular rolling friction rather than sliding friction.

The main advantage of the transfer plate according to the present invention is its simplicity of construction, for it can be assembled with basically modular components arranged side by side in any number according to the length to be covered. Furthermore, the transfer plate according to the present invention possesses great strength because the individual tiles are fixed individually to the frame and because each tile is coupled to the adjacent tile by interlocking means.

Furthermore, the receiving plate according to the present invention has also been found to be very space-saving, its dimensions in plan view being very limited as they are practically entirely used for the purposes of conveying the products, by virtue of the fact that the fixing means are contained within the useful area of the receiving plate. Its space requirements are also very limited in the vertical direction, since the thickness of the tiles of the plate may be very small, sufficient for each to contain its own roller set.

It is obvious that a person skilled in the art will be able to make many modifications to and variations of the receiving plate described above for the purpose of satisfying individual and particular needs while remaining within the scope of protection of the invention as defined in the following claims.

What we claim is:

1. Structure for a plate for receiving products as they come off a carry section of an endless chain-type conveyor, capable of being positioned coplanar with the said carry section essentially in the continuation thereof, comprising tiles arranged together side by side at least on sides that lie transversely to the said carry section, wherein the said tiles are arranged together by interlocking them along the said transverse sides.

2. Plate structure according to claim 1, wherein it comprises an end tile, having a projecting lip on one transverse side and interlocking means on the opposite transverse side, and at least one extension tile, having complementary interlocking means, which fit the interlocking means of the end tile, on one transverse side, and interlocking means identical to the interlocking means of the end tile on the opposite transverse side.

3. Plate structure according to claim 2, wherein each of the said interlocking means comprises tenons and mortises, the tenons and mortises being arranged asymmetrically with respect to a longitudinal axis of the receiving plate.

4. Plate structure according to claim 3, wherein it comprises a second end tile identical to the said end tile and positioned at the opposite end of the plate from the first end tile and the opposite way around.

5. Plate structure according to claim 1, wherein each tile comprises a respective roller set having at least one row of rollers mounted on a respective spindle in such a way as to rotate idly.

6. Plate structure according to claim 1, wherein on each longitudinal side, each tile comprises a laterally open seat for a screw for fixing the plate to a frame.

7. Plate structure according to claim 6, wherein the said seat opens at the top through an opening designed to allow access to the screw by a wrench.

8. Plate structure according to claim 7, wherein the opening is designed to allow access by a wrench to a hexagon socket-head screw.

9. Plate structure according to claim 8, wherein the said opening is located underneath the roller set and in that the rollers of at least one row of rollers are axially moveable, with play along the spindle of not less than the transverse dimensions of the wrench.

* * * * *